(12) United States Patent
Simon et al.

(10) Patent No.: US 9,519,811 B1
(45) Date of Patent: Dec. 13, 2016

(54) SYSTEM AND METHOD FOR READING RFID TAGS ACROSS A PORTAL

(71) Applicants: Pierre-Michel G. Simon, Gradignan (FR); Eric F. Riggert, Trabuco Canyon, CA (US); Steve E. Trivelpiece, Rancho Santa Margarita, CA (US)

(72) Inventors: Pierre-Michel G. Simon, Gradignan (FR); Eric F. Riggert, Trabuco Canyon, CA (US); Steve E. Trivelpiece, Rancho Santa Margarita, CA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 14/974,938

(22) Filed: Dec. 18, 2015

(51) Int. Cl.
*G06K 7/10* (2006.01)

(52) U.S. Cl.
CPC ....... *G06K 7/10128* (2013.01); *G06K 7/10009* (2013.01); *G06K 7/10306* (2013.01); *G06K 7/10366* (2013.01)

(58) Field of Classification Search
CPC ............ G06K 7/10009; G06K 7/10306; G06K 7/10366; G06K 7/10128; G06K 7/01; G08B 13/14; G08B 1/08
USPC .................................. 340/10.1, 10.51, 10.5
See application file for complete search history.

(56) References Cited

U.S. PATENT DOCUMENTS 9,007,178 B2 * 4/2015 Nikitin ............... G06K 7/10009
340/10.1

\* cited by examiner

*Primary Examiner* — Ali Neyzari
(74) *Attorney, Agent, or Firm* — Fox Rothschild LLP; Robert J. Sacco; Carol E. Thorstadt-Forsyth (57) ABSTRACT

Method and system for reading radio frequency identification (RFID) tags in a portal system comprises performing a first detection and a second detection of the RFID tags in a portal zone. The method further involves performing a first and second sampling of the RFID tags in the portal zone. Thereafter, based on the first detection, second detection, first sampling and second sampling, an occurrence is determined of at least one of the RFID tags transitioning between a first physical space on one side of the portal system and a second physical space on an opposing side of the portal system.

22 Claims, 7 Drawing Sheets

| | | | |
|---|---|---|---|
| Session 0 | A | B | Energized persistence = indefinite<br>Non-energized persistence = 0 |
| Session 1 | A | B | 500ms <Energized persistence < 5s<br>500ms <Non-energized persistence < 5s |
| Session 2 | A | B | Energized persistence: Indefinite<br>Non-energized persistence > 2s |
| Session 3 | A | B | Energized persistence: Indefinite<br>Non-energized persistence > 2s |

SYSTEM AND METHOD FOR READING RFID TAGS ACROSS A PORTAL

BACKGROUND OF THE INVENTION

Statement of the Technical Field

The inventive arrangements relate to RFID portal systems, and more particularly to RFID portals which identify a travel direction of RFID tags crossing a portal transition.

Description of the Related Art

The related art concerns RFID systems and more particularly RFID portals. An RFID portal is system which is used for tracking items passing through doorways, hallways or corridors. Conventional RFID portals identify the direction of RFID tags crossing a portal transition defined by a choke point through which items must pass when they move from one defined area to a second defined area. In many implementations, an RFID portal consists at minimum of two separate antennas and a RFID reader. The tag directionality is easily determined by the order of the reads. A tag read by a first antenna and then by the second antenna is likely moving from the first to second antenna. However, this implementation requires multiple read zones with separated mounting points and cannot be applied to all use cases.

RFID portals can also use beam steerable antennas to detect the presence of RFID tags in different locations as they move through a portal zone. In a conventional configuration, the minimum setup is one RFID reader and one beam steerable antenna. In such scenarios, the physical separation between multiple antennas is no longer needed to determine tag directionality.

A number of organizations have set standards for RFID tags. One type of RFID tag for which a standard has been established is known as an EPCglobal UHF Class 1 Generation 2 (hereinafter "EPC Gen2") type tags. These tags have certain well known characteristics.

SUMMARY OF THE INVENTION

The invention concerns a method and system for reading radio frequency identification (RFID) tags in a portal system. As an example, the RFID tags can be tags which conform to an EPCglobal UHF Class 1 Generation 2 RFID tag standard.

The method involves a series of steps which are intended to determine a read pattern or an order of RFID tag reads, as an RFID tag is transitioning through a portal. The process begins by performing a first detection of one or more RFID tags in a portal zone having a predetermined flag set by generating with an RFID portal at first detection intervals at least one first detection RF field, directed toward a first physical space on a first side of a boundary. The first detection RF field is used to excite RFID tags within a first detection proximity to the RFID portal using one of a Session 2 and a Session 3 mode, having a long duration session persistence. A second detection step is also performed. In the second detection step, the RFID tags in the portal zone which have the predetermined flag set are detected by generating with the RFID portal at second detection intervals at least one second detection RF field. The second detection RF field is directed toward a second physical space on a second side of the boundary opposed to the first side, to excite RFID tags within a second detection proximity to the RFID portal using one of the Session 2 and Session 3 mode.

The method further involves performing a first sampling of the RFID tags in the portal zone having the predetermined flag set. This step involves generating with the RFID portal at first sample cycle intervals at least one first sampling RF field, directed toward the first physical space. This field is used to excite the RFID tags within a first sampling proximity to the RFID portal using a Session 0 mode having a minimal duration session persistence which is less than Session 2 and Session 3 mode. For example, the minimal duration session persistence associated with Session 0 can be approximately zero duration following termination of the first and second sampling RF field. The first sampling proximity extends a lesser distance from the RFID portal as compared to the first detection proximity.

A second sampling of RFID tags in the portal zone is performed for tags having the predetermined flag set. This step involves generating with the RFID portal at second sample cycle intervals at least one second sampling RF field. This second sampling RF field is directed toward the second physical space, and is intended to excite the RFID tags within a second sampling proximity to the RFID portal. The second sampling RF field also employs the Session 0 mode, and the second sampling proximity extends a lesser distance from the RFID portal as compared to the second detection proximity.

Based on the first detection, second detection, first sampling and second sampling, a determination is made concerning an occurrence of at least one of the RFID tags transitioning between the first physical space and the second physical space. The determination involves determining a direction of the transitioning between the first physical space and the second physical space. More particularly, such determination is based on a read pattern or an order in which the at least one RFID tag is detected with respect to the first detection, second detection, first sampling and second sampling.

The process can also involve a first and second survey of the RFID tags having a predetermined flag set. In the first survey, RFID tags having a predetermined flag set are determined by generating with the RFID portal at first survey intervals at least one first survey RF field. The first survey RF field is directed toward the first physical space. More particularly, the first survey RF field is used to excite RFID tags within the first detection proximity to the RFID portal using Session 1 mode, which has a session persistence of between 500 milliseconds and five seconds. In the second survey, of RFID tags which have the predetermined flag set are identified by generating with the RFID portal at second survey intervals at least one second survey RF field. The second survey RF field is directed toward the second physical space, to excite RFID tags within the second detection proximity to the RFID portal using the Session 1 mode.

According to one aspect, the first detection, second detection, first sampling and second sampling are performed at a higher frequency as compared to the first survey and second survey. According to another aspect, the first detection and second detection are performed at a read rate which is sufficiently frequent to prevent a session timeout in the RFID tags so that the RFID tags are prevented from responding respectively to the first and second detection RF field after an initial response.

The method also involves selectively controlling an antenna beam direction using at least one RFID antenna. More particularly, the RFID antenna is used to direct the at least one first detection RF field toward the first physical space and to direct the at least one second detection RF field toward the second physical space.

According to a further aspect, an RF power level applied to an RFID antenna is controlled to achieve the first and second detection proximity, and the first and second sampling proximity. According to a further aspect, each of the first detection, second detection, first sampling, and second sampling can be performed using separate beams of RF energy which are serially generated and originating from different antenna locations.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. However, the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

One of the challenges of beam steerable antennas in an RFID portal is the lack of field separations (i.e. overlap) between fields generated by different beams. A tag crossing such a system has to be read multiple times, after which the read pattern must be analyzed to extract the trend and eventfully the directionality of tag movement. In addition, static (i.e., non-moving) tags surrounding such portal are constantly being read by the system. This necessarily reduces the available time (and number) of tag reads which can be performed with respect to tags that are transitioning through the system. These limitations lead to a poor read pattern and directionality decision.

The design of an RFID portal requires consideration of several different competing requirements. The portal should be able to (1) inventory all tags crossing the portal, (2) provide enough reads per crossing tag to determine directionality of movement, (3) inventory all static tags surrounding the portal, and (4) detect and focus on crossing tags. This is not a trivial exercise. A simple method constantly attempting to inventory all tags in field of view of each antenna will fail to reach the requirements. A common practice for purposes of trying to reach these goal can involve interrogating tags using the dual-target mode in one of the latched sessions S1, S2 or S3. In the dual-target mode, each of the tags will be read continuously regardless of whether the tag is in state "A" or state "B". The expectation in such scenarios is to be able to read all tags within the field of view (FOV) of the inventoried reader antenna, regardless of the inventoried flag state. The power level of the RFID electromagnetic exciter field is manually tuned to limit the reading of static tags which might be far from the system. But as more time is spent by an RFID reader to inventory the tags in the FOV of its steerable antenna, the opportunities increase to miss a tag that is crossing in an area that is not then covered by the antenna beam. This problem becomes particularly noteworthy when many tags are present. It also detracts from the ability of the portal to focus attention on the tags which are actually crossing through the portal (as opposed to static tags which are not in motion.

According to one aspect of the inventive arrangements, improved performance is achieved by executing a combination of RFID tag reads using different sessions, power levels and beam directions so as to maximize RFID portal accuracy in a dense tag population. The unique combination of those read cycles allows an RFID portal to detect the surroundings tags while focusing on the crossings tags.

Figure 1:
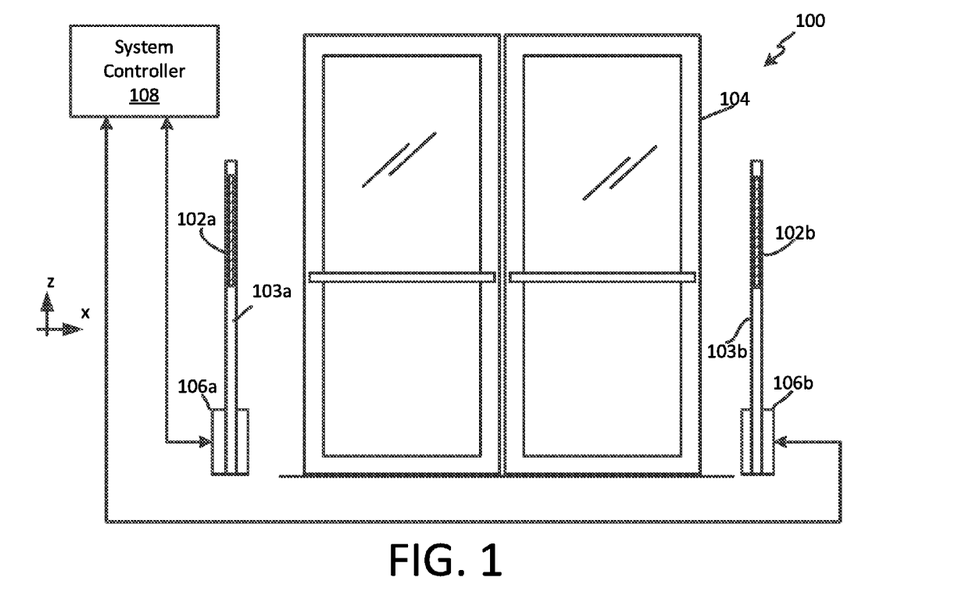
FIG. 1 is a plan view of an RFID portal system at a choke point.
Figure 2:
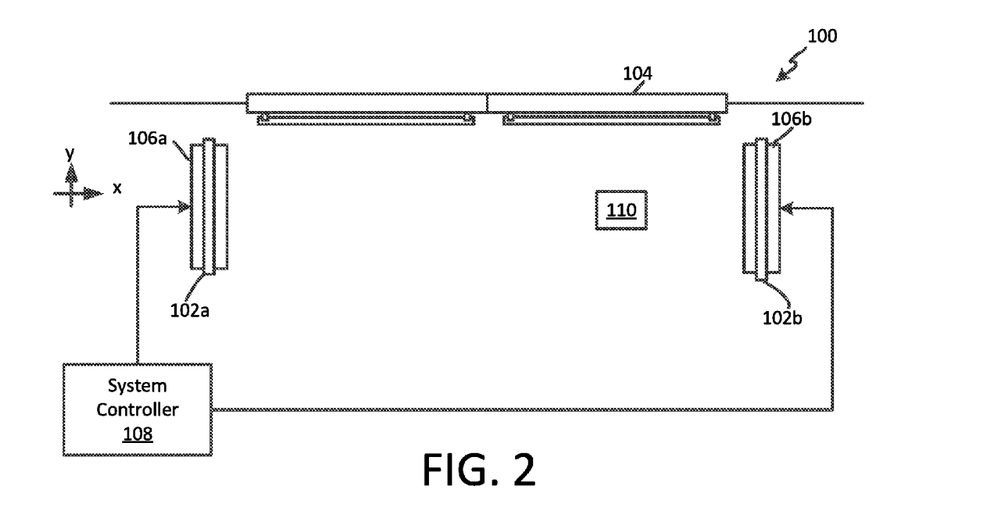
FIG. 2 is a top view of the RFID portal system in FIG. 1.
Figure 3:
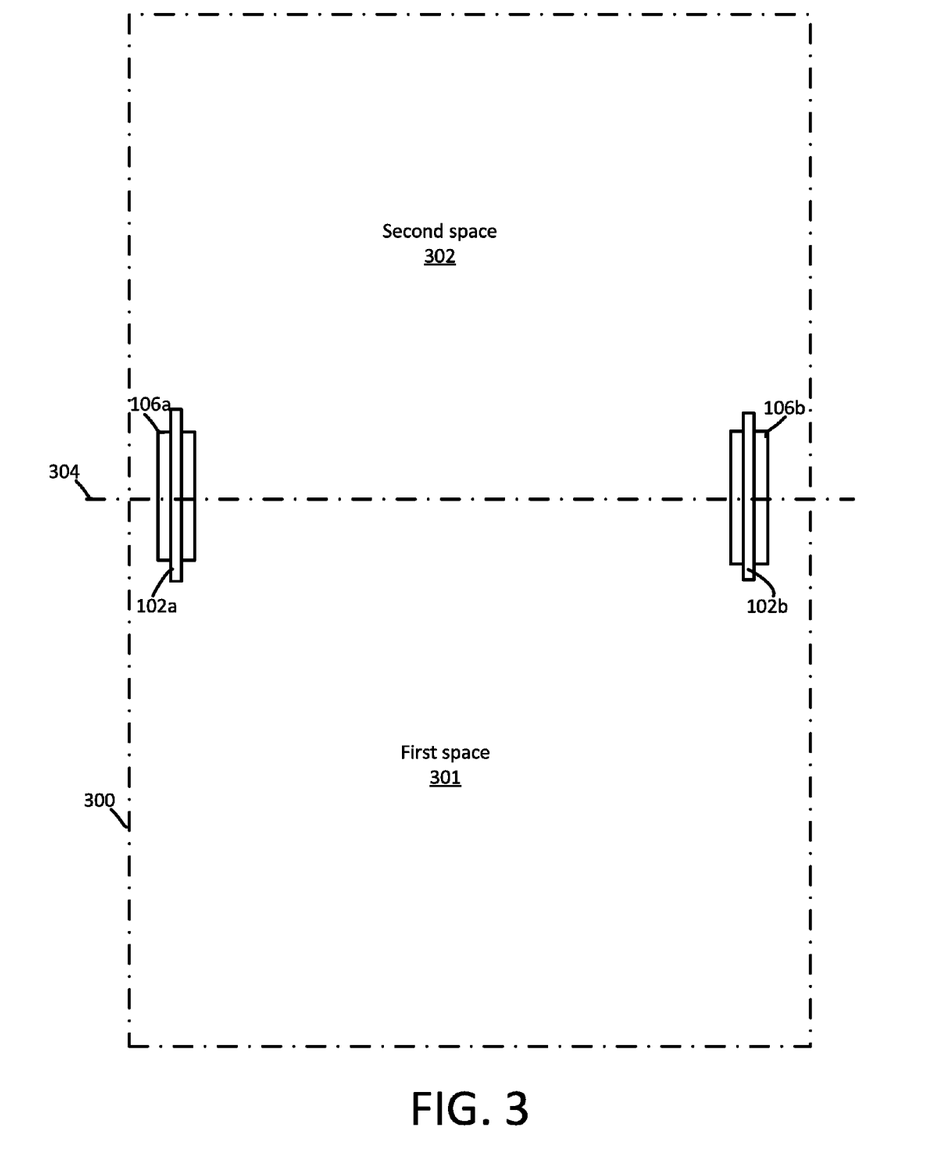
FIG. 3 is a drawing that is useful for understanding the concept of a portal zone surrounding the RFID portal system in FIG. 1.

In FIGS. 1-3 there is shown an RFID portal system 100 which is useful for understanding certain aspects of the invention. The RFID portal system includes two RFID readers 106a, 106b and each of them are respectively attached to antennas 102a, 102b mounted on sides of the portal. RFID readers are well known in the art and therefore will not be described here in detail. However, it should be understood that an RFID reader as referenced herein will be capable of generating RFID tag exciter signals to control and elicit responses from one or more of a plurality of RFID tags in a RFID portal zone. The RFID exciter signals can also serve as a source of power for energizing the RFID tags. The exciter signals generated by the RFID reader and responses received by the reader will be in accordance with an RFID system standard that is now known or known in the future. The RFID tag reader will also be capable of detecting, identifying and/or processing one or more the responses from the plurality of RFID tags in a portal zone. The RFID readers can include suitable interface circuitry to facilitate communications with a system controller 108 as described below. For example, the interface circuitry can facilitate communication of information regarding detected responses received from RFID tags. Such interface circuitry can also facilitate reception of interrogation commands and/or antenna beam control commands from the system controller.

In the arrangement shown, the antennas are mounted on pedestals 103a, 103b, but the invention is not limited in this regard. The antennas could be mounted in the ceiling or in the ground, and the method described herein would still be applicable. There is no restriction regarding the type of antennas which are used to produce the required field patterns. However, in this example, antennas are understood to be beam steerable so that multiple different antenna beam directions can be obtained from a single antenna 102a, 102b. Control over the required antenna field patterns can be facilitated by the RFID readers as noted above. Also, two antennas are shown in FIG. 1, but it should be understood that the invention is not limited in this regard. The inventive arrangements descried herein could be implemented using a single beam steerable antenna.

The RFID portal system 100 can be placed in the vicinity of a physical choke point 104 in a facility where goods and items must pass through in order to transition from one space to a second space. In the example shown in FIGS. 1 and 2, the choke point 104 is a doorway, but the invention is not limited in this regard. The RFID readers 106a, 106 can be operated under the command of a system controller 108 which facilitates the detection of one or more RFID tags 110 within a field of view of each antenna as hereinafter described.

As shown in FIG. 3, the RFID portal system 100 will define a boundary 304 which separates a portal zone 300 into a first space 301 and a second space 302. The portal zone generally defines the area in which the RFID portal system 100 is capable of detecting and reading RFID tags. The portal zone is shown as a regular rectangular shape in FIG. 3, but it should be understood that the actual shape of the zone can be somewhat irregular, as it will depend on the portal reader, antenna system and environmental factors which defines the field of view of the system. The first space and the second space are respectively physical spaces or areas of the portal zone defined on opposing sides of the boundary as shown. The RFID portal system will (1) inventory all tags crossing the portal between the first and second space, (2) provide enough reads per crossing tag to determine directionality of such movement, (3) inventory all static tags in the portal zone surrounding the portal.

In order to understand the operation of the RFID portal system 100, it is useful to note some basic features of the well-known EPC Gen2 type RFID tags. Each EPC Gen2 compliant tag can selectively have one of two states: "A" and "B". The "A" state is the default state for such tags; but under predetermined conditions, the tags can be caused to transition to the "B" state. The tag will remain in the "B" state for some period of time, known as a persistence time. When the tag times-out of the "B" state, it will automatically revert to the "A" state.

Figure 4:
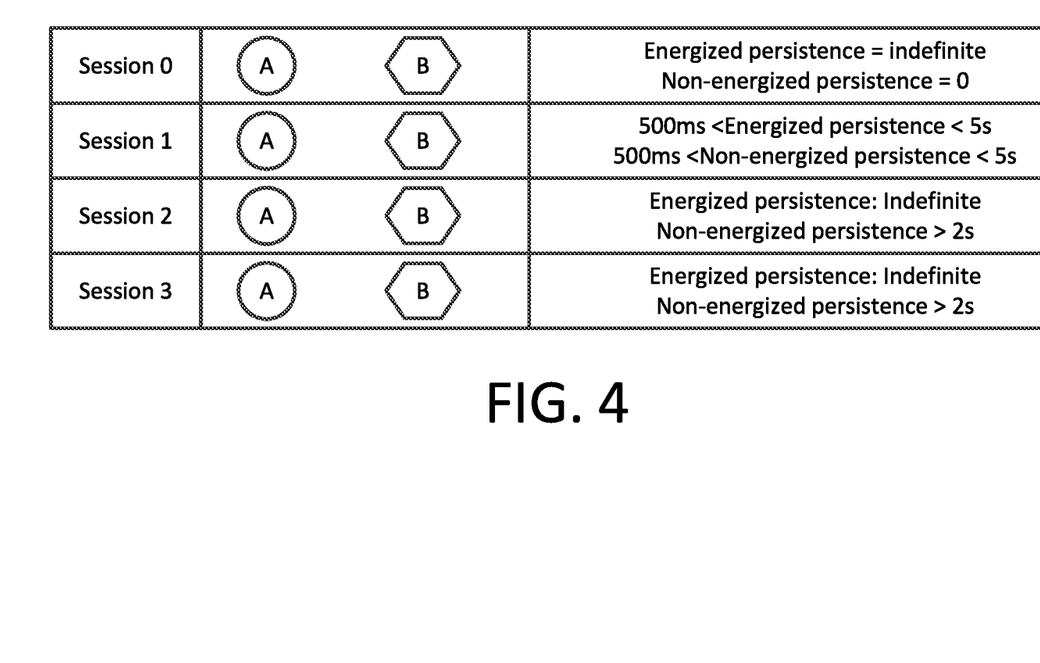
FIG. 4 is a chart which is useful for understanding the operation of a certain type of RFID tag.

Referring now to FIG. 4, an EPC Gen2 tag facilitates up to four different sessions: Session 0, Session 1, Session 2, and Session 3. For convenience, these sessions are sometimes referred to as S0, S1, S2, and S3. As shown in FIG. 4, some of these sessions have a different persistence time as compared to other sessions. The persistence time can also be affected by whether or not the tag is energized or excited by an electromagnetic RFID reader field. As is known, an RFID reader will select which session is to be used during a particular inventory cycle. The flag state "A" or "B" for each of session S0, S1, S2, and S3 can be controlled independently of the flag state set in other sessions.

Figure 5A:
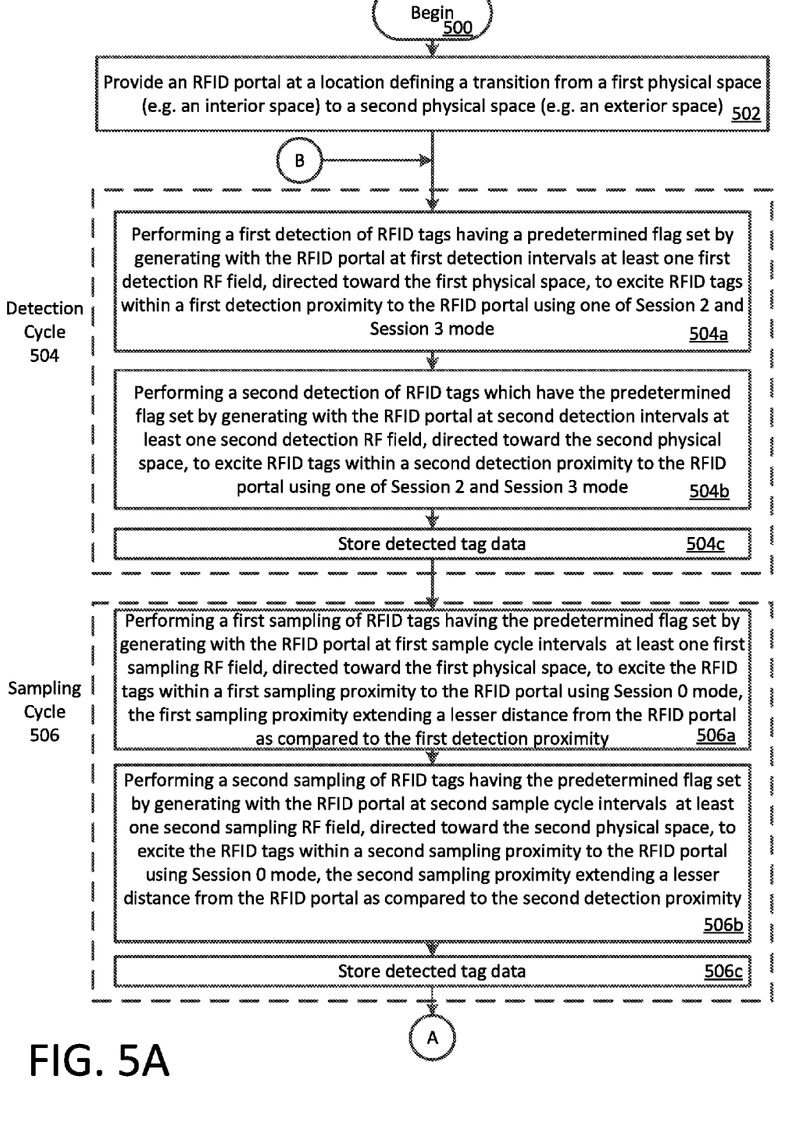
FIG. 5A is a flow chart which is useful for understanding a tag detection process in an RFID portal.
Figure 5B:
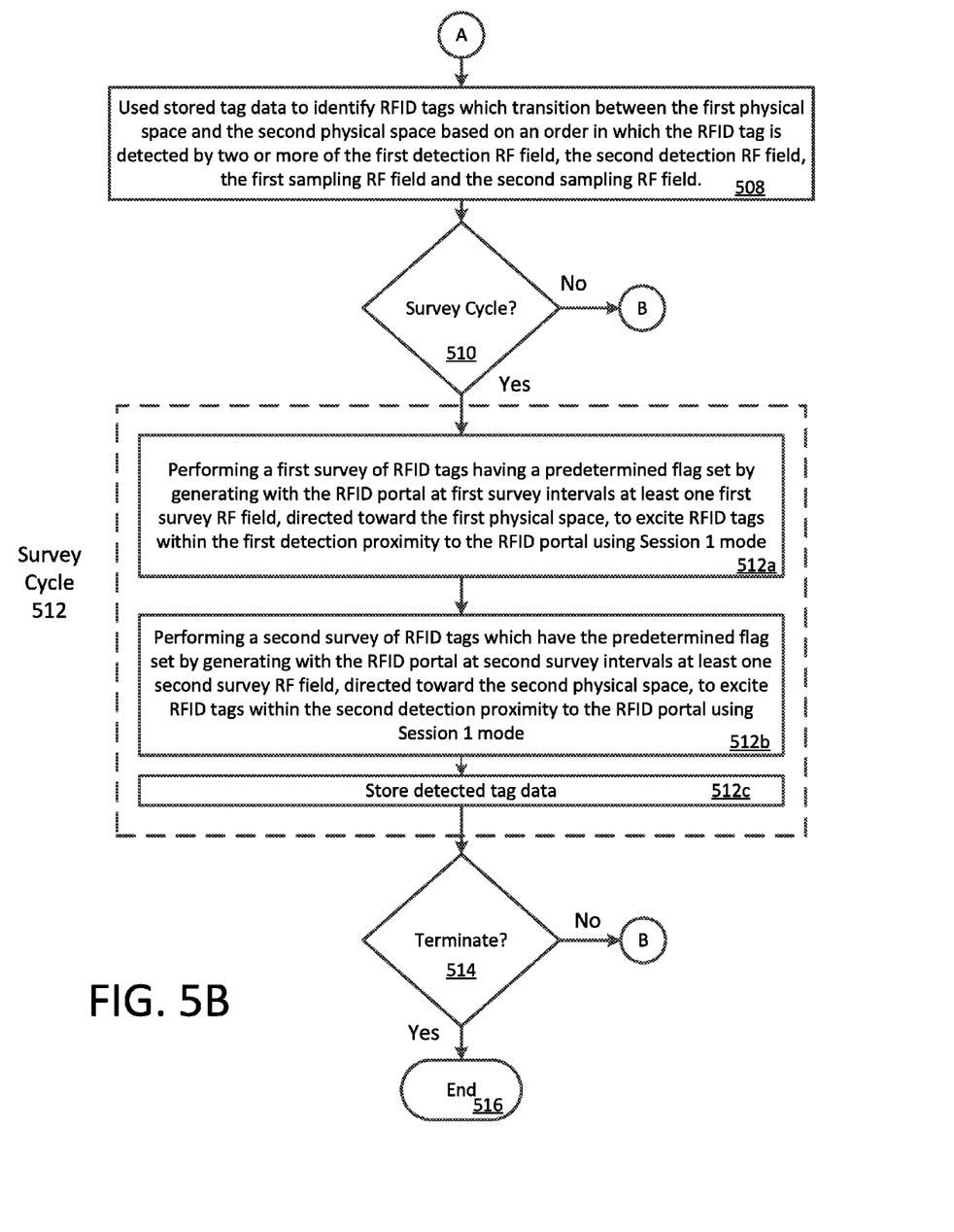
FIG. 5B is a continuation of the flowchart in FIG. 5A.

A method for operating an RFID portal will now be described with reference to FIGS. 5A and 5B. The process begins at 502 with the provision of an RFID portal 100 at a location (e.g. choke point location 104) defining a transition from the first physical space 301 to the second physical space 302. As shown in FIGS. 5A and 5B, the method generally involves three different cycles to facilitate the portal goals described herein. The three cycles include a Detection Cycle 504, a Sampling Cycle 506 and Survey Cycle 512.

Detection Cycle

Figure 6A:
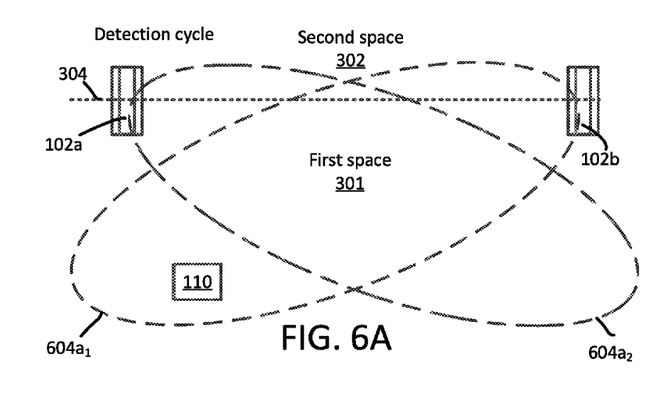
FIGS. 6A and 6B are a set of drawings which are useful for understanding certain RF fields which are generated by a portal system as part of an RFID tag Detection Cycle.
Figure 6B:
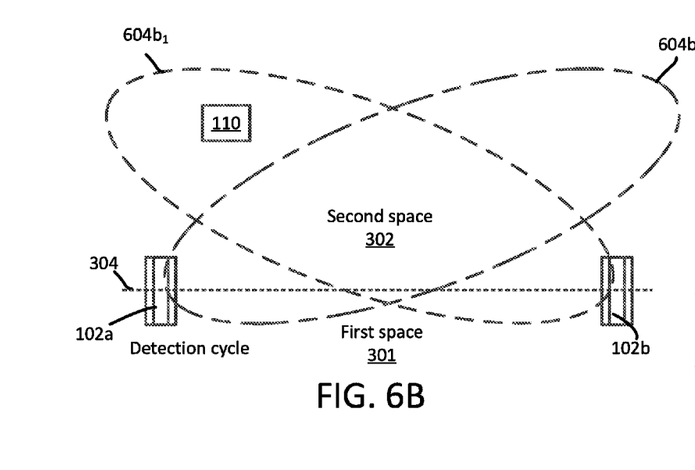
Figure 7A:
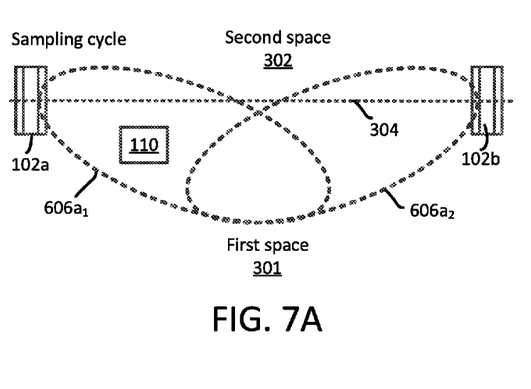
FIGS. 7A and 7B are a set of drawings which are useful for understanding certain RF fields which are generated by a portal system as part of an RFID tag Sampling Cycle.
Figure 7B:
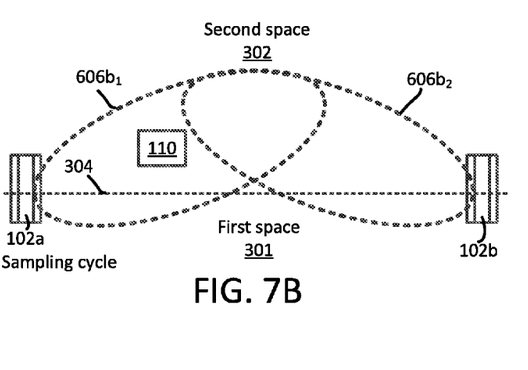

The purpose of the detection cycle is to identify and maintain an inventory of the tags which are in the portal zone 300. In the Detection Cycle, the readers 106a, 106b use the antennas to perform an inventory round at full power in Session 2 (with beams directed toward the first space 301), and at full power in Session 3 (with antenna beams directed toward the second space 302). The beams $604a_1$, $604a_2$, $604b_1$ and $604b_2$ associated with the Detection Cycle are illustrated in FIGS. 6A and 6B. In the Detection Cycle as described herein, Session 2 is used for beams directed toward the first space and Session 3 is used for the beams directed toward the second space. However, it should be understood that this exact selection is not a requirement with respect to the first and second spaces. The sessions for these two spaces can be inverted without functional losses. So in the Detection Cycle as described herein, Session 3 can be used for beams directed toward the first space 301 and Session 2 can be used for the beams directed toward the second space 302.

As used herein, the phrase "inventory round" refers to each instance in which RFID tags 110 within the portal zone are activated using RF activation signals from the RFID reader. By using full power RF beams as shown in FIGS. 6A and 6B, the portal system 100 is able to maximize the area around the portal in which RFID tags 110 will be activated. The goal at this stage is to include the full portal zone 300 as the area in which tags will be potentially activated. The inventory rounds performed by the portal during the detection cycle are Single Target rounds. As is known, when an RFID reader performs a Single Target round, it reads only "A" state tags and then transitions each such tag to its "B" state. This cycle is performed as often as is practically possible.

The Detection Cycle is intended to allow RFID tags 110 to only be read a single time in the portal zone 300. All new tags entering this zone are detected by this cycle. RFID tags previously read in this cycle will not respond a second time. This is accomplished by choosing the repetition rate of each inventory round during the Detection Cycle to be sufficiently high compared to persistence time of the tags in Sessions 2 and 3 so that the tags which have been read will never have the opportunity to revert back from state "B" to state "A". As long as the tags remain in state "B", they will not be read during subsequent Detection Cycle reads. Accordingly, it can be generally assumed that static RFID tags in the portal zone 300 will reply only once and are not responsive to detection cycle inventory rounds occurring after that. As long as the system remains active and the tags stay in the field of view of the antenna beams, they will stay charged by incident RF power of each Detection Cycle read. Consequently, they will not revert to state "A" and therefore will not respond to future Detection Cycle inventory rounds.

It should be noted that the Detection Cycle described herein will allow detection of new RFID tags entering the portal zone 300. Further, it should be appreciated that the Detection Cycle described herein will provide two potential reads for an RFID tag that is in the portal zone and crosses boundary 304. The tag will be read once during Session 2 while in the first space 301 and will be read a second time in Session 3 when/if it arrives second space 302. So as a result of the Detection Cycle described herein, the tag will be read once in the first space 301 and once in the second space 302, even in a densely populated tag environment.

Having now generally described the Detection Cycle 504, we refer again to FIG. 5A which shows that the Detection Cycle is comprised of steps 504a, 504b and 504c. Step 504a involves a first detection of RFID tags having a predetermined flag set (e.g., Flag A). In this step, the RFID portal 100 generates at first detection intervals at least one first detection RF field or beam $604a_1$, $604a_2$, directed toward the first physical space 301. These beams are used to excite RFID tags 110 within a first detection proximity to the RFID portal using one of Session 2 and Session 3 mode. Where two beams $604a_1$, $604a_2$ are provided as in the case where there are two pedestals as shown, the beams can be produced in serial fashion, one after the other to perform the first detection using each beam.

Thereafter, the process continues in 504b with a second detection of RFID tags which have the predetermined flag set (e.g., Flag A). In this step, the RFID portal 100 generates at second detection intervals at least one second detection RF field or beam $604b_1$, $604b_2$. These beams are directed toward the second physical space 302. Where two beams $604b_1$, $604b_2$ are provided as in the case where there are two pedestals as shown, the beams can be produced in serial fashion, one after the other to perform the second detection using each beam. The beams $604b_1$, $604b_2$ are used to excite RFID tags within a second detection proximity to the RFID portal using one of Session 2 and Session 3 mode which was not previously used in step 504a. The first and second detection intervals can be the same or different.

In step 504c, the identity of the RFID tags which are detected in steps 504a, 504b are stored in a memory or data store. In addition to the tag identification information (e.g. a tag serial number), the stored data will include information specifying a time when the RFID tag was detected, and whether the tag was detected in response to the first or second detection RF field.

Sampling Cycle

The purpose of the Sampling Cycle 506 is to identify RFID tags 110 that are within the portal zone, but which are relatively close to the portal and potentially crossing the portal boundary. This is in contrast to the inventory rounds performed during the Detection Cycle, which are intended to activate tags which are both close to and further away from the portal as shown in FIGS. 6A and 6B. Because the Sampling Cycle utilizes Session 0, it can potentially provide many reads while a tag is crossing the boundary 304 from either direction. In the Sampling Cycle, the readers 106a, 106b use the antennas 102a, 102b to perform an inventory round at adjusted power in Session 0. The antenna beams $606a_1$ and $606a_2$ are individually controlled so that they are directed toward the first space 301. Where two beams 606a1, 606a2 are provided as in the case where there are two pedestals as shown, the beams can be produced in serial fashion, one after the other, to perform the first sampling using each beam.

Thereafter, the beams $606b_1$ and $606b_2$ are directed toward the second space 302. Where two beams $606b_1$, $606b_2$ are provided as in the case where there are two pedestals as shown, the beams can be produced in serial fashion, one after the other to perform the second sampling using each beam. It can be observed that the antenna beams $606a_1$, $606a_2$, $606b_1$ and $606b_2$ used during the Sampling Cycle extend a smaller distance into the portal zone as compared to the antenna beams $604a_1$, $604a_2$, $604b_1$, $604b_2$ which are used during the Detection Cycle.

The inventory rounds performed during the Sampling Cycle are Single Target rounds. As explained above, this means that the RFID readers will read only "A" state tags and then transition each such tag to its "B" state. This cycle is performed as often as is practically possible. In Session 0, the RFID tags which have been transitioned to state "B" will revert to state "A" immediately each time the Session 0 read signal is interrupted at the end of each inventory round. This allows multiple reads per tag in the adjusted power field of view used during the Sampling Cycle.

According to one aspect of the invention, the power level applied to the antenna by the reader during the Sampling Cycle is advantageously adjusted based on an evaluation of static tag reads. The power level in the Sampling Cycle can be decreased if previous Sampling Cycle reads are found to detect too many static tags. Conversely, the power level that the reader applies to the antenna during the Sampling Cycle can be increased if previous cycles hit none or few static tags.

Having now generally described the Sampling Cycle 506, we refer again to FIG. 5A which shows that the Sampling Cycle is comprised of steps 506a, 506b and 506c. Step 506a involves a first sampling of RFID tags 110 having a predetermined flag set (e.g., Flag A). In this step, the RFID portal 100 generates at first sample cycle intervals at least one first sampling RF field or beam $606a_1$, $606a_2$, directed toward the first physical space 301. These beams are used to excite RFID tags 110 within a first sampling proximity to the RFID portal using Session 0 mode. The first sampling proximity defined by beams $606a_1$, $606a_2$ will extend a lesser distance from the boundary 304 of the RFID portal as compared to the first detection proximity defined by beams $604a_1$, $604a_2$. Thereafter, the process continues in 506b with a second sampling of RFID tags which have the predetermined flag set (e.g., Flag A). In this step, the RFID portal 100 generates at second sample cycle intervals at least one second sampling RF field or beam $606b_1$, $606b_2$. These beams are directed toward the second physical space 302. The beams are used to excite RFID tags within a second sampling proximity to the RFID portal using Session 0. The second sampling proximity defined by beams $606b_1$, $606b_2$ will extend a lesser distance from the boundary 304 of the RFID portal 100 as compared to the second detection proximity defined by beams $604b_1$, $604b_2$. The first and second sample cycle intervals can be the same or different.

In step 506c, the identity of the RFID tags which are detected in steps 506a, 506b are stored in a memory or data store. In addition to the tag identification information (e.g. a tag serial number), the stored data will include information specifying a time when the RFID tag was detected, and whether the tag was detected in response to the first or second sampling RF field.

RF Time Per Antenna

The time allocated to each beams $606a_1$, $606a_2$, $606b_1$, and $606b_2$ used during the Sampling Cycle and each beam $604a_1$, $604a_2$, $604b_1$ and $604b_2$ used during the Detection Cycle are chosen so that an RFID tag carried at walk speed across the boundary 304 can have the opportunity to be read in at least two (2) Detection Cycles and two (2) Sampling Cycles. For example, in a portal system 100 with two readers 106a, 106b managing four beams $606a_1$, $606a_2$, $606b_1$, and $606b_2$ (used during the Sampling Cycle) and four beam $604a_1$, $604a_2$, $604b_1$ and $604b_2$ (used during the Detection Cycle), each reader would have to perform 16 inventory rounds while the tag is crossing the portal to ensure that each beam has the opportunity for two reads. Considering an average time window of 3 seconds while the tag is in the field of view of the portal system, the maximum time to be allocated to each beam/antenna would be 3000 milliseconds/16=187.5 milliseconds. Of course, the invention is not limited in this regard, and lesser read times are also possible within the scope of the invention.

Read Fields

Following the Detection Cycle and Sampling Cycle, the process continues in FIG. 5B at step 508 by identifying RFID tags which transition between the first physical space and the second physical space. The occurrence and direction of such transitions are based on an order in which an RFID tag is detected by two or more of the RF field beams $604a_1$, $606a_1$, $606b_1$, and $604b_1$.

In order to facilitate an understanding of the foregoing concept, FIGS. 6A, 6B, 7A and 7B show the various RF beams associated with the Detection Cycle and Sample Cycle in overlapped fashion. Due to the power differences and differing directions of the beams which are used during the Detection Cycle and Sampling Cycle, an RFID tag 700 which crosses the boundary 304 is expected to encounter at least four (4) fields. For example, consider an RFID tag 700 which begins moving in first space 301, traveling in direction 702 from the first space to the second space. The tag first encounters beam $604a_1$ and/or $604a_2$ for at least one inventory round associated with the Detection Cycle. As it continues moving in direction 702, the tag next encounters beam $606a_1$ for at least one round of the Sampling Cycle. As the tag moves further along direction 702 and crosses the boundary 304, it will encounter beam $606b_1$ for at least a second round of the Sampling Cycle. As the tag continues along direction 702, it will last encounter beam $604b_1$ and/or $604b_2$ for a further inventory round of the Detection Cycle.

So the tag would first be detected on the side of the portal where the tag is coming from, in the range of the Detection Cycle beam $604a_1$, and out of range of the Sampling cycle beams. The tag would then be on the side of the portal where the tag is coming from and in the range of the Sampling cycle beams $606a_1$, $606a_2$. The tag would thereafter be on the side of the portal were the tag is going to and in the range of the Sampling Cycle beams $606b_1$, $606b_2$. The tag would then be on the side of the portal where the tag is going to and only in the range of the Detection Cycle beams $604b_1$, $604b_2$. The direction of a tag crossing the portal can be easily determined by evaluating the order in which the tag encountered the electromagnetic fields produced by each of the beams. For example, if the order of detection is field $604a_1$, $606a_1$, $606b_1$, $604b_1$, then the tag is obviously moving in direction 702.

Survey Cycle

The process continues at 510 with a determination as to whether a sufficient time interval has elapsed so as to require a Survey Cycle. If not (510: No) then the process returns to step 504a and continues. However, if an elapsed time since an occurrence of the previous Survey Cycle exceeds a preset value (e.g. five seconds) (510: Yes) then a Survey Cycle is initiated in step 512.

In the Survey Cycle, the readers 106a, 106b perform an inventory round at full power in Session 1 on both sides of the boundary. Accordingly, in the Survey Cycle, the readers 106a, 106b use the antennas 102a, 102b to perform an inventory round at full power in Session 1 with beams directed toward the first space 301, and at full power in Session 1 with antenna beams directed toward the second space 302. Accordingly, antenna beams used during this round will extend a maximum distance into the portal zone as shown in FIGS. 6A and 6B. These inventory rounds are also Single Target rounds and therefor look only for tags in inventoried flag A. This cycle is performed at a relatively low frequency compared to the inventory rounds which are performed during the Detection Cycle and Sampling Cycle. For example, inventory rounds associated with the Survey Cycle can be performed every 5 seconds or more. The inventory rounds performed corresponding to the Survey Cycle allow all inventory tags located in the portal zone to be read, regardless of whether the tag is a new tag or a static tag. Static tags reply once at each cycle, thereby allowing the readers to detect them.

Having now generally described the Survey Cycle 512, we refer to FIG. 5B which shows that the Survey Cycle is actually comprised of steps 512a, 512b. Step 512a involves a first survey of RFID tags 110 having a predetermined flag set (e.g., Flag A). In this step, the RFID portal 100 generates at first survey cycle intervals at least one first survey RF field or beam directed toward the first physical space 301. These beams are used to excite RFID tags 110 within the first detection proximity to the RFID portal using Session 1 mode. As such, the at least one survey RF field can extend a distance from the boundary 304 of the portal system which is substantially the same as the first detection RF field or beams $604a_1$, $604a_2$. Where two beams $604a_1$, $604a_2$ are provided as in the case where there are two pedestals as shown, the beams can be produced in serial fashion, one after the other to perform the first survey using each beam.

Thereafter, the process continues in 512b with a second survey of RFID tags which have the predetermined flag set (e.g., Flag A). In this step, the RFID portal 100 generates at second survey cycle intervals at least one second survey RF field or beam. These beams are used to excite RFID tags 110 within the second detection proximity to the RFID portal using Session 1 mode. As such, the at least one second survey RF field or beam can extend a distance from the boundary 304 of the portal system which is substantially the same as the second detection RF field or beams $604b_1$, $604b_2$. Where two beams $606b_1$, $606b_2$ are provided as in the case where there are two pedestals as shown, the beams can be produced in serial fashion, one after the other, to perform the second survey 512b using each beam. The first and second survey cycle intervals can be the same or different.

In step 512c, the identity of the RFID tags which are detected in steps 512a, 512b are stored in a memory or data store. In addition to the tag identification information (e.g. a tag serial number), the stored data will include information specifying a time when the RFID tag was detected, and whether the tag was detected in response to the first or second sampling RF field.

Following step 512c, a determination can be made at 514 as to whether the process should terminate. If not (514: No) then the process returns to 504a; otherwise (514: Yes) the process terminates at step 516.

System Controller

Figure 8:
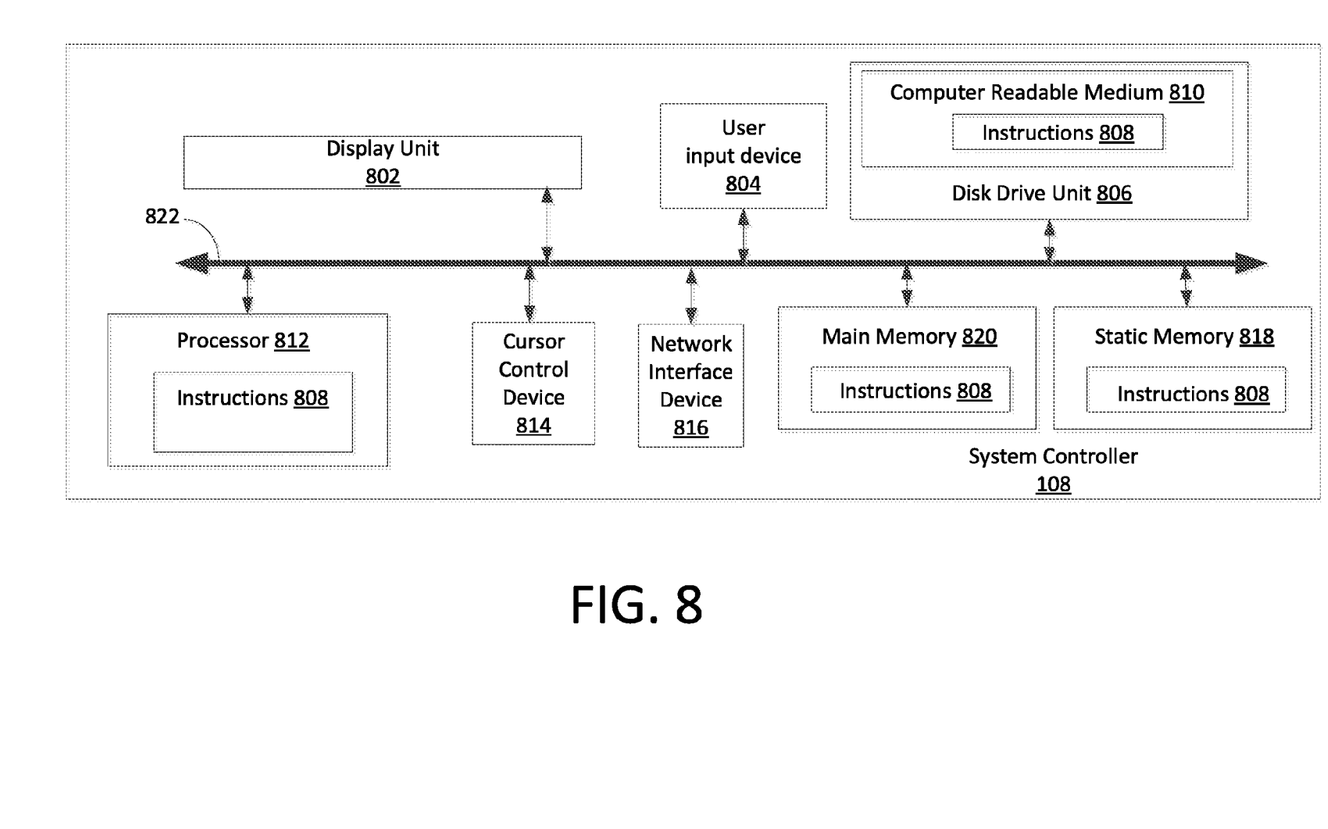
FIG. 8 is useful for understanding the function of the several RF fields which are shown in FIGS. 6A, 6B, 7A and 7B.

As noted above with respect to FIG. 1, the operation of the RFID readers 106a, 106b and antennas 102a, 102b can be under the supervision of a system controller 108. In some scenarios the system controller 108 can be integrated as part of an RFID reader 106a, 106b. Referring now to FIG. 8, a system controller 108 includes a processor 812 (such as a central processing unit (CPU), a disk drive unit 806, a main memory 820 and a static memory 818, which communicate with each other via a bus 822. The system controller 108 can further include a display unit 802, such as a video display (e.g., a liquid crystal display or LCD), a flat panel, a solid state display, or a cathode ray tube (CRT)). The system controller 108 can include a user input device 804 (e.g., a keyboard), a cursor control device 814 (e.g., a mouse) and a network interface device 816.

The disk drive unit 806 includes a computer-readable storage medium 810 on which is stored one or more sets of instructions 808 (e.g., software code) configured to implement one or more of the methodologies, procedures, or functions described herein. The instructions 808 can also reside, completely or at least partially, within the main memory 820, the static memory 818, and/or within the processor 812 during execution thereof by the system controller. The main memory 820 and the processor 812 also can constitute machine-readable media.

Those skilled in the art will appreciate that the system controller architecture illustrated in FIG. 8 is one possible example of a system controller. However, the invention is not limited in this regard and any other suitable system controller architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and system controllers. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein. In the various embodiments of the present invention a network interface device 816 connected to a network environment communicates over the network using the instructions 808.

While the computer-readable storage medium 810 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for reading radio frequency identification (RFID) tags in a portal system, comprising:
    performing a first detection of one or more RFID tags in a portal zone having a predetermined flag set by generating with an RFID portal at first detection intervals at least one first detection RF field, directed toward a first physical space on a first side of a boundary, to excite the RFID tags within a first detection proximity to the RFID portal using one of a Session 2 and a Session 3 mode, having a long duration session persistence;
    performing a second detection of the RFID tags in the portal zone which have the predetermined flag set by generating with the RFID portal at second detection intervals at least one second detection RF field, directed toward a second physical space on a second side of the boundary opposed to the first side, to excite RFID tags within a second detection proximity to the RFID portal using one of the Session 2 and Session 3 mode;
    performing a first sampling of the RFID tags in the portal zone having the predetermined flag set by generating with the RFID portal at first sample cycle intervals at least one first sampling RF field, directed toward the first physical space, to excite the RFID tags within a first sampling proximity to the RFID portal using a Session 0 mode having a minimal duration session persistence which is less than the Session 2 and Session 3 mode, the first sampling proximity extending a lesser distance from the RFID portal as compared to the first detection proximity;
    performing a second sampling of RFID tags in the portal zone having the predetermined flag set by generating with the RFID portal at second sample cycle intervals at least one second sampling RF field, directed toward the second physical space, to excite the RFID tags within a second sampling proximity to the RFID portal using the Session 0 mode, the second sampling proximity extending a lesser distance from the RFID portal as compared to the second detection proximity; and
    based on the first detection, second detection, first sampling and second sampling, determining an occurrence of at least one of the RFID tags transitioning between the first physical space and the second physical space.

2. The method according to claim 1, further comprising determining a direction of the transitioning between the first physical space and the second physical space based on a read pattern in which the at least one RFID tag is detected with respect to the first detection, second detection, first sampling and second sampling.

3. The method according to claim 1, further comprising performing:
    a first survey of the RFID tags having a predetermined flag set by generating with the RFID portal at first survey intervals at least one first survey RF field, directed toward the first physical space, to excite the RFID tags within the first detection proximity to the RFID portal using a Session 1 mode, which has a session persistence of between 500 milliseconds and five seconds; and
    performing a second survey of the RFID tags which have the predetermined flag set by generating with the RFID portal at second survey intervals at least one second survey RF field, directed toward the second physical space, to excite the RFID tags within the second detection proximity to the RFID portal using the Session 1 mode.

4. The method according to claim 3, further comprising selecting the RFID tags to conform to an EPCglobal UHF Class 1 Generation 2 RFID tag standard.

5. The method according to claim 3, further comprising performing said first detection, second detection, first sampling and second sampling at a higher frequency as compared to the first survey and second survey.

6. The method according to claim 1, further comprising performing the first detection and second detection at a read rate which is sufficiently frequent to prevent a session timeout in the RFID tags, whereby the RFID tags are prevented from responding respectively to the first and second detection RF field after an initial response.

7. The method according to claim 6, further comprising selecting the minimal duration session persistence associated with the Session 0 to be approximately zero duration following termination of the first and second sampling RF field.

8. The method according to claim 1, further comprising selectively controlling an antenna beam direction using at least one RFID antenna to direct the at least one first detection RF field toward the first physical space and to direct the at least one second detection RF field toward the second physical space.

9. The method according to claim 1, further comprising controlling an RF power level applied to an RFID antenna to control the first and second detection proximity, and the first and second sampling proximity.

10. The method according to claim 1, further comprising performing each of the first detection, second detection, first sampling, and second sampling using separate beams of RF energy serially generated and originating from different antenna locations.

11. The method according to claim 1, further comprising performing at least one RF power level adjustment during at least one of the first and second sampling based on a number of the RFID tags detected in previous occurrences of the first and second sampling.

12. The method according to claim 11, wherein the RF power level is reduced when a number of the RFID tags detected in at least one of the first and second sampling exceeds a predetermined number.

13. The method according to claim 11, wherein the RF power level is increased when a number of the RFID tags detected in at least one of the first and second sampling is less than a predetermined number.

14. A radio frequency identification (RFID) tag portal system, comprising:
a system controller;
at least one RFID reader operatively coupled to the system controller;
at least one RFID steerable antenna system capable of controlling a direction of an RF beam in response to a beam control signal;
the system controller configured to generate one or more commands to cause the RFID reader in cooperation with the RFID steerable antenna system to
perform a first detection of one or more RFID tags in a portal zone having a predetermined flag set by generating with an RFID portal at first detection intervals at least one first detection RF field, directed toward a first physical space on a first side of a boundary, the at least one first detection RF field exciting RFID tags within a first detection proximity to the RFID portal using one of a Session 2 mode and a Session 3 mode, having a long duration session persistence,
perform a second detection of the RFID tags in the portal zone which have the predetermined flag set by generating with the RFID portal at second detection intervals at least one second detection RF field, directed toward a second physical space on a second side of the boundary opposed to the first side, the at least one second detection RF field exciting RFID tags within a second detection proximity to the RFID portal using one of the Session 2 mode and the Session 3 mode,
perform a first sampling of the RFID tags in the portal zone having the predetermined flag set by generating with the RFID portal at first sample cycle intervals at least one first sampling RF field, directed toward the first physical space, the at least one first sampling RF field exciting the RFID tags within a first sampling proximity to the RFID portal using a Session 0 mode having a minimal duration session persistence which is less than the Session 2 mode and Session 3 mode, the first sampling proximity extending a lesser distance from the RFID portal as compared to the first detection proximity,
perform a second sampling of the RFID tags in the portal zone having the predetermined flag set by generating with the RFID portal at second sample cycle intervals at least one second sampling RF field, directed toward the second physical space, the at least one second sampling RF field exciting the RFID tags within a second sampling proximity to the RFID portal using the Session 0 mode, the second sampling proximity extending a lesser distance from the RFID portal as compared to the second detection proximity, and
based on the first detection, second detection, first sampling and second sampling, determine an occurrence of at least one of the RFID tags transitioning between the first physical space and the second physical space.

15. The system according to claim 14, wherein the system controller determines a direction of the transitioning between the first physical space and the second physical space based on a read pattern in which the at least one RFID tag is detected with respect to the first detection, second detection, first sampling and second sampling.

16. The system according to claim 14, wherein the system controller is configured to generate one or more further commands to cause the RFID reader in cooperation with the RFID steerable antenna system to:
perform a first survey of the RFID tags having a predetermined flag set by generating with the RFID portal at first survey intervals at least one first survey RF field, directed toward the first physical space, the at least one first survey RF field exciting RFID tags within the first detection proximity to the RFID portal using a Session 1 mode, which has a session persistence of between 500 milliseconds and five seconds; and
perform a second survey of the RFID tags which have the predetermined flag set by generating with the RFID portal at second survey intervals at least one second survey RF field, directed toward the second physical space, the second survey RF field exciting RFID tags within the second detection proximity to the RFID portal using the Session 1 mode.

17. The system according to claim 16, wherein the RFID tags conform to an EPCglobal UHF Class 1 Generation 2 RFID tag standard.

18. The system according to claim 16, wherein said first detection, second detection, first sampling and second sampling are performed at a higher frequency as compared to the first survey and second survey.

19. The system according to claim 14, wherein the first detection and second detection are performed at a read rate which is sufficiently frequent to prevent a session timeout in the RFID tags, whereby the RFID tags are prevented from responding respectively to the first and second detection RF field after an initial response.

20. The system according to claim 14, wherein at least one of the RFID reader and the system controller is configured to selectively control the RFID steerable antenna system to direct the at least one first detection RF field toward the first physical space and to direct the at least one second detection RF field toward the second physical space.

21. The system according to claim 14, wherein the system controller is configured to selectively control the RFID reader so as to cause an RF power level applied to an RFID antenna to determine the first and second detection proximity, and the first and second sampling proximity.

22. The system according to claim 14, wherein the system controller is configured to selectively control the RFID reader so as to cause each of the first detection, second detection, first sampling, and second sampling to be performed using separate beams of RF energy serially generated and originating from different antenna locations.

\* \* \* \* \*